(12) United States Patent
Amirhamzeh

(10) Patent No.: US 12,576,330 B2
(45) Date of Patent: Mar. 17, 2026

(54) SPORTS GAME SYSTEM

(71) Applicant: Hassan Amirhamzeh, Encino, CA (US)

(72) Inventor: Hassan Amirhamzeh, Encino, CA (US)

( * ) Notice: Subject to any disclaimer, the term of this patent is extended or adjusted under 35 U.S.C. 154(b) by 265 days.

(21) Appl. No.: 18/377,179

(22) Filed: Oct. 5, 2023

(65) Prior Publication Data

US 2025/0114688 A1      Apr. 10, 2025

(51) Int. Cl.
| | |
|---|---|
| *A63B 63/00* | (2006.01) |
| *A63B 65/00* | (2006.01) |
| *A63D 1/02* | (2006.01) |
| *B62K 3/00* | (2006.01) |

(52) U.S. Cl.
CPC ............... *A63D 1/02* (2013.01); *A63B 63/00* (2013.01); *A63B 65/00* (2013.01); *B62K 3/002* (2013.01)

(58) Field of Classification Search
CPC ....... A63B 63/00; A63B 65/00; A63B 67/002; A63B 67/06; A63B 67/14; A63B 2067/146
See application file for complete search history.

(56) References Cited

U.S. PATENT DOCUMENTS

| | | | | | |
|---|---|---|---|---|---|
| 1,994,862 | A | * | 3/1935 | Muller | .................... A63B 59/30 |
| | | | | | 473/514 |
| 3,820,790 | A | * | 6/1974 | Peterson | .................. B62K 9/00 |
| | | | | | 280/211 |
| 4,277,068 | A | * | 7/1981 | Sasaki | ....................... F41B 7/08 |
| | | | | | 473/511 |

| | | | | | |
|---|---|---|---|---|---|
| 5,664,776 | A | * | 9/1997 | Mateer | ................... A63B 67/06 |
| | | | | | 273/126 R |
| D396,079 | S | | 7/1998 | Coon | |
| 5,989,097 | A | | 11/1999 | Lebedz | |
| 6,168,175 | B1 | | 1/2001 | Lan | |
| 6,347,972 | B1 | * | 2/2002 | Gormley | ................ A63H 33/26 |
| | | | | | 446/447 |

(Continued)

FOREIGN PATENT DOCUMENTS

| | | |
|---|---|---|
| GB | 2481006 | 12/2011 |

OTHER PUBLICATIONS

SLOTS—The Original Wheel Rolling Outdoo Yards and Beach Game, https://www.amazon.com/SLOTS-Wheel-Rolling-Competitive-Alternative-Cornhole/dp/B0C6L3H5NY#:~:text=Product%20Description,you%20coming%20back%20for%20more., earlies comments, Jul. 2023.*

(Continued)

*Primary Examiner* — William M Pierce

(57) ABSTRACT

A sports game system for enjoying an outdoor space with a competitive game includes a net having an open front side, a closed rear side, and a peripheral side. The closed rear side and the peripheral side bound an inner area that is accessible through the open front side. A first wheel can be launched toward the net. A handle is releasably couplable to the first wheel. The handle has a shaft and a grip and can propel the first wheel toward the net when the first wheel is launched using the handle, whereby the inner area receives the first wheel. A fork extends from the shaft opposite the grip, releasably coupling the first wheel to the handle. A scooter assembly may releasably couple to the handle thereby assembling a scooter when the first wheel is attached to the handle and the handle is attached to the scooter assembly.

10 Claims, 10 Drawing Sheets

(56) References Cited

U.S. PATENT DOCUMENTS

| | | | |
|---|---|---|---|
| 7,581,794 B1 * | 9/2009 | Milow | B60B 7/12 |
| | | | 403/353 |
| 10,183,718 B2 | 1/2019 | Privitelli | |
| 10,328,357 B2 * | 6/2019 | Tarng | A63H 33/18 |
| 2003/0162600 A1 * | 8/2003 | Blacklock | A63B 69/3632 |
| | | | 473/259 |
| 2004/0038759 A1 * | 2/2004 | Kuzia | G09F 23/0066 |
| | | | 273/400 |
| 2009/0143175 A1 * | 6/2009 | Tarng | A63B 67/00 |
| | | | 473/470 |
| 2012/0292851 A1 * | 11/2012 | Monopoli | A63F 7/00 |
| | | | 273/126 R |
| 2014/0024286 A1 | 1/2014 | Mungai | |
| 2019/0291017 A1 | 9/2019 | Yohannes | |

OTHER PUBLICATIONS

Rolo Spinx _ Outdoor Wheel Rolling Game, https://rolotoys.com/?
srsltid=AfmBOoq3AV8BVuWldMoP5iXPKfsEsiJeQBAMjTqobc3
yJjHNtbKiy8wc, Dec. 2023.*
Hoop Rilling Wikipedia, https://en.wikipedia.org/wiki/Hoop_
rolling#:~:text=Hoop%20rolling%2C%20also%20called%20hoop,or%
20to%20do%20various%20tricks.&text=Hoop%20rolling%20has%
20been%20documented,guided%20by%20a%20metal%20hook, 1972.*
Rollors—The Next Great Outdoor Game, https://rollors.com, Jun.
2023.*

* cited by examiner

1

SPORTS GAME SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to yard games and more particularly pertains to a new yard game for exercising and enjoying an outdoor space with a fun and competitive game.

(2) Description of Related Art Including Information Disclosed Under 37 CFR 1.97 and 1.98

The prior art relates to yard games. In some yard games, a user launches a ball, a sack, or another object toward a goal or a target. The user earns points by hitting the goal or target and competes against other users, typically trying to earn more points than the other users. Examples of such yard games include horseshoes, ladder toss, bocce ball, and bocce ball. In other yard games, the user may use a guide stick to direct a hoop or a ball toward a specific area or goal. Examples of such games include hoop rolling and golf. However, these games all include pieces or devices that need to be transported to and from the game-playing area. Typically, the pieces or devices are stored in boxes or other containers. There is a need in the art for a yard game that can be stored in a fun and exciting apparatus. There is also a need in the art for a yard game that provides exciting, competition-based exercise for the user.

BRIEF SUMMARY OF THE INVENTION

An embodiment of the disclosure meets the needs presented above by generally comprising a net having an open front side, a closed rear side, and a peripheral side. The closed rear side and the peripheral side bound an inner area that is accessible through the open front side. A first wheel is configured to be launched toward the net. A handle is releasably couplable to the first wheel. The handle has a shaft and a grip and is configured to propel the first wheel toward the net when the first wheel is launched using the handle. A fork extends from the shaft opposite the grip, releasably coupling the first wheel to the handle. The net is configured to receive the first wheel within the inner area when the first wheel is launched toward the open front side. A scooter assembly may be releasably coupled to the handle whereby a scooter is assembled when the first wheel is coupled to the handle and the handle is coupled to the scooter assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
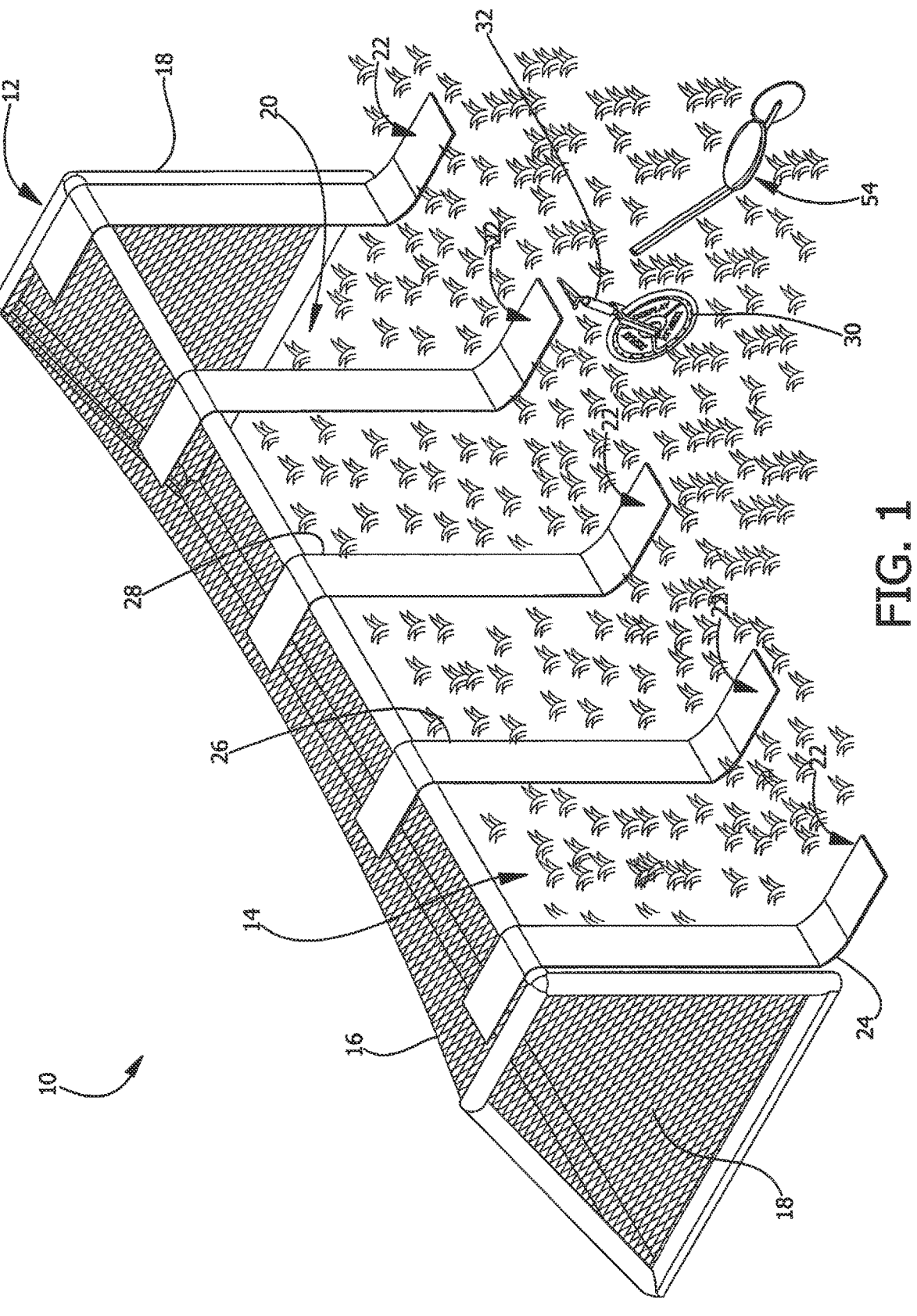
FIG. 1 is an isometric view of a sports game system according to an embodiment of the disclosure.
Figure 2:
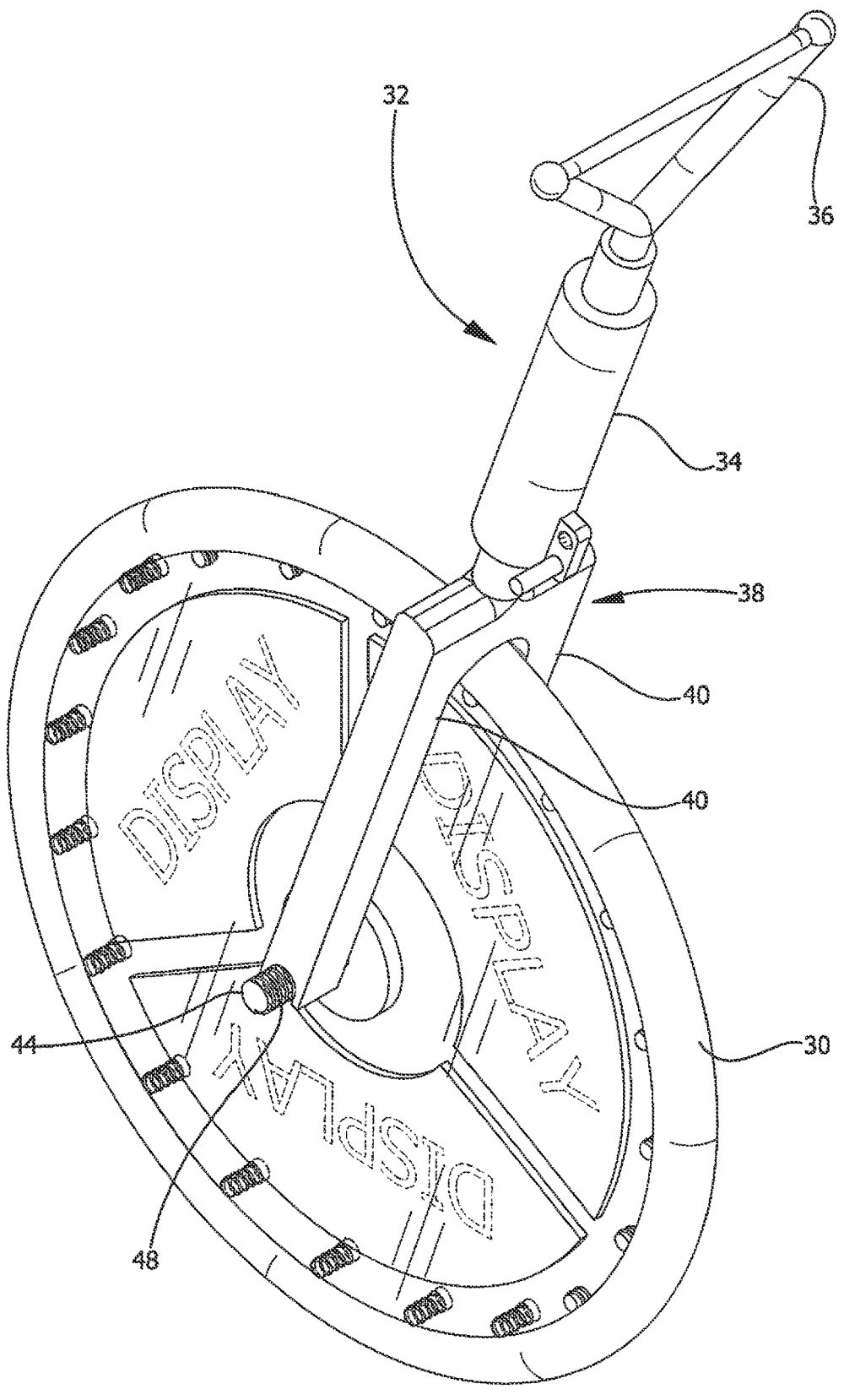
FIG. 2 is an isometric view of an embodiment of the disclosure.
Figure 3:
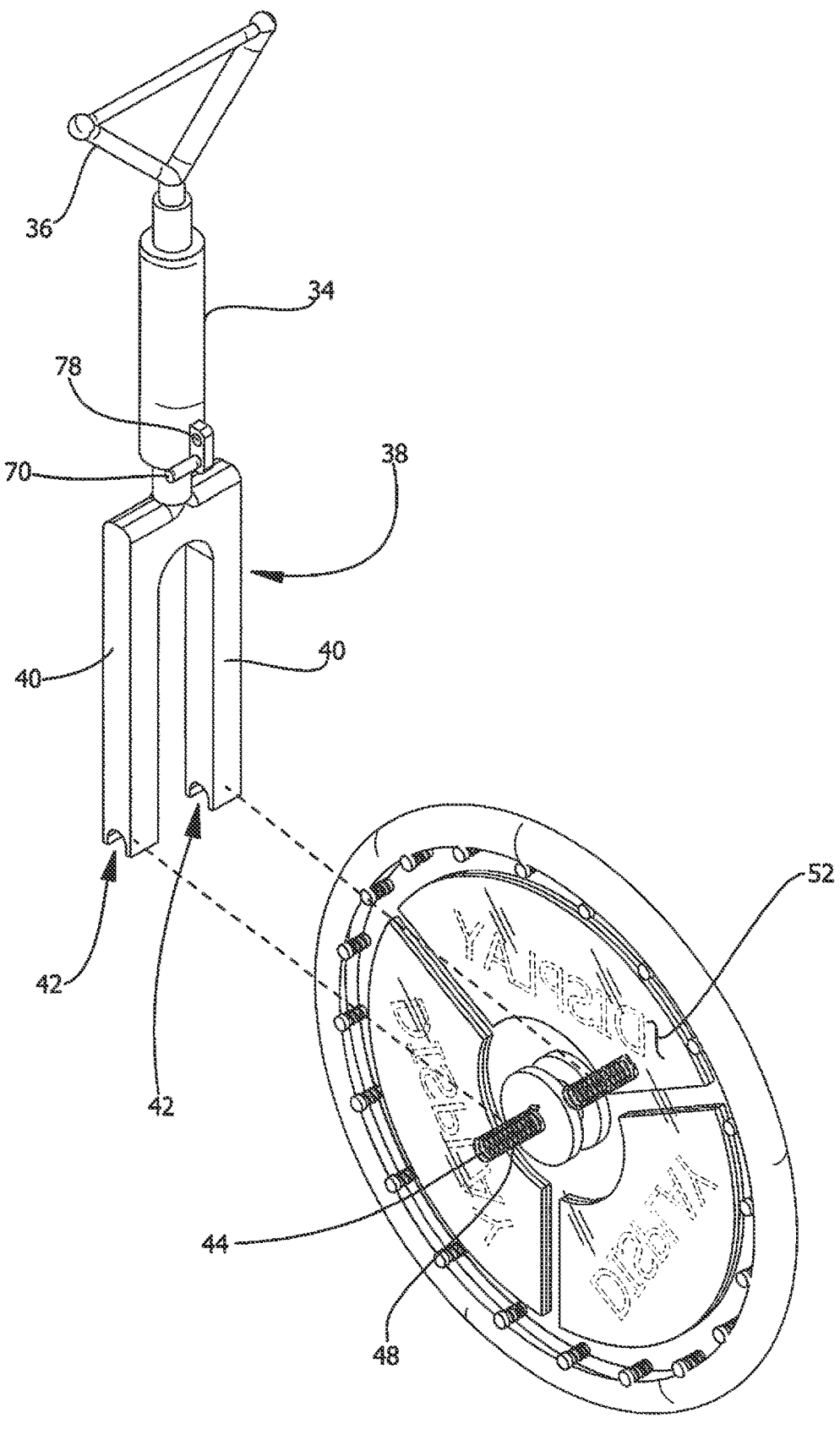
FIG. 3 is an exploded view of an embodiment of the disclosure.

With reference now to the drawings, and in particular to FIGS. 1 through 10 thereof, a new yard game embodying the principles and concepts of an embodiment of the disclosure and generally designated by the reference numeral 10 will be described.

As best illustrated in FIGS. 1 through 10, the sports game system 10 generally comprises a first wheel 30 that can be propelled or launched toward a net 12. A user 11 can launch the first wheel 30 toward the net 12 using their hands and arms or using a handle 32 that can be releasably coupled to the first wheel 30.

The net 12 generally comprises an open front side 14, a closed rear side 16, and a peripheral side 18. The closed rear side 16 and the peripheral side 18 bound an inner area 20. The open front side 14 permits access to the inner area 20.

A plurality of strips 22 may be positioned or positionable across the open front side 14. For example, in some embodiments, the plurality of strips 22 may be coupled to the net 12 extending downwardly across the open front side 14, as shown in FIG. 1. In another example, the plurality of strips 22 may be movably couplable to the net 12 so that the user 11 can arrange the plurality of strips 22 in alternative positions for different types of games. Each of the plurality of strips 22 generally corresponds to a point or a score. Each one of the plurality of strips 22 may correspond to a different number of points, or each one of the plurality of strips 22 may correspond to the same number of points. For example, a first one of the plurality of strips 24 may correspond to 10.0 points, a second one of the plurality of strips 26 may correspond to 20.0 points, and a third one of the plurality of strips 28 may correspond to 30.0 points. Alternatively, all of the plurality of strips 22 may correspond to a particular point total, such as 10.0 points, and the spaces between each of the plurality of strips 22 may correspond to an alternative point total, such as 5.0 points.

The sports game system 10 further comprises the first wheel 30 that is configured to be launched toward the net 12. In example embodiments, the sports game system 10 may further comprise a handle 32 having a shaft 34 and a grip 36. The shaft 34 extends downwardly from the grip 36. The handle 32 is releasably couplable to the first wheel 30 and is configured to propel the first wheel 30 toward the net 12 when the first wheel 30 is launched using the handle 32.

The net 12 is configured to receive the first wheel 30 within the inner area 20 when the first wheel 30 is launched toward the open front side 14. The front wheel 30 may pass through the open front side 14 between the plurality of strips 22. For example, the user 11 may score the point corresponding to the plurality of strips 22 when the first wheel 30 collides with one of the plurality of strips 22 after the user 11 launches the first wheel 30 toward the net 12. Alternatively, the user 11 may score the point by simply launching the first wheel 30 into the net 12 through the open front side 14, without trying to hit any of the plurality of strips 22. Accordingly, some embodiments may omit the plurality of strips 22. Additional alternative rules and scorekeeping methods may also be used, and the examples given in this disclosure are not intended to exclude such embodiments of the sports game system 10.

A fork 38 generally extends from the shaft 34 opposite the grip 36. The fork 38 releasably couples the first wheel 30 to the handle 32. Embodiments of the fork 38 may include a pair of arms 40 extending downwardly from the shaft 34, wherein each of the pair of arms 40 has a notch 42 extending therethrough.

An axle 44 may extend outwardly through the first wheel 30. Each of the notches 42 is configured to receive the axle 44 when the first wheel 30 is coupled to the handle 32. A fastener 46 releasably couples the handle 32 to the axle 44. For example, the fastener 46 may be a nut. In such embodiments, the axle 44 may include an axle threading 48 and the fastener 46 may include a fastener threading 50. The axle threading 48 is complementary to the fastener threading 50 such that the fastener 46 can be threadably coupled to the axle 44. Rotation of the fastener 46 on the axle 44 when each of the notches 42 has received the axle 44 is configured to tighten the fastener 46 on the axle 44 thereby bracing the pair of arms 40 on the first wheel 30 and securing the handle 32 to the first wheel 30.

A display board 52 may be removably mounted on the first wheel 30. For example, the display board 52 may surround the axle 44. The display board 52 may include decorative indicia, such as advertisements, cartoons, figures, patterns, or colors. The display board 52 may be removed from the first wheel 30 and replaced with an alternative display board having different decorative indicia. In one example embodiment shown in FIG. 7, a transparent casing 80 may hold the display board 52 on the first wheel 30. For example, the transparent casing 80 may comprise plexiglass. A plurality of screws 82 may be arranged around a perimeter of the first wheel 30 such that the transparent casing 80 can be temporarily removed and the display board 52 can be exchanged with the alternative display board. In other embodiments, the display board 52 may be affixed directly to the first wheel 30, for example by the plurality of screws 82 or by other fasteners that mount the display board 52 directly onto the first wheel 30. In other embodiments, the display board 52 may be mounted to the first wheel 30 without being removable therefrom, for example being glued or otherwise affixed to the first wheel 30. In still other embodiments, the display board 52 may not be attached to the first wheel 30.

The sports game system 10 may further include a scooter assembly 54 that is releasably couplable to the handle 32 thereby forming a scooter 56 when the first wheel 30 is coupled to the handle 32 and the handle 32 is attached to the scooter assembly 54. The scooter 56 is configured to carry the user 11 when the user 11 is riding on the scooter 56.

Figure 4:
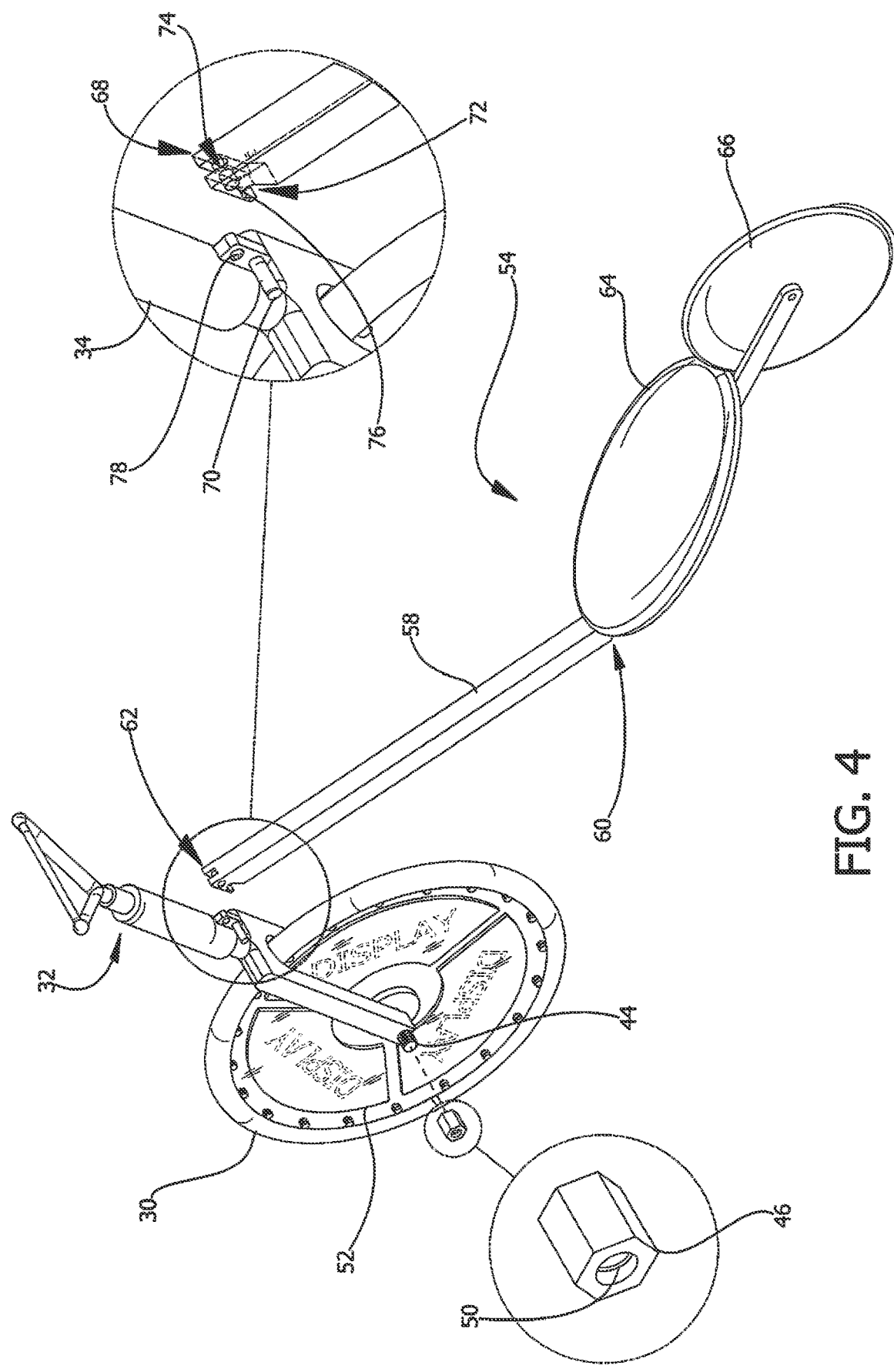
FIG. 4 is a detailed view of an embodiment of the disclosure.
Figure 5:
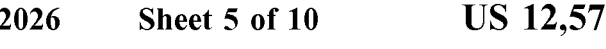
FIG. 5 is a side view of an embodiment of the disclosure.
Figure 6:
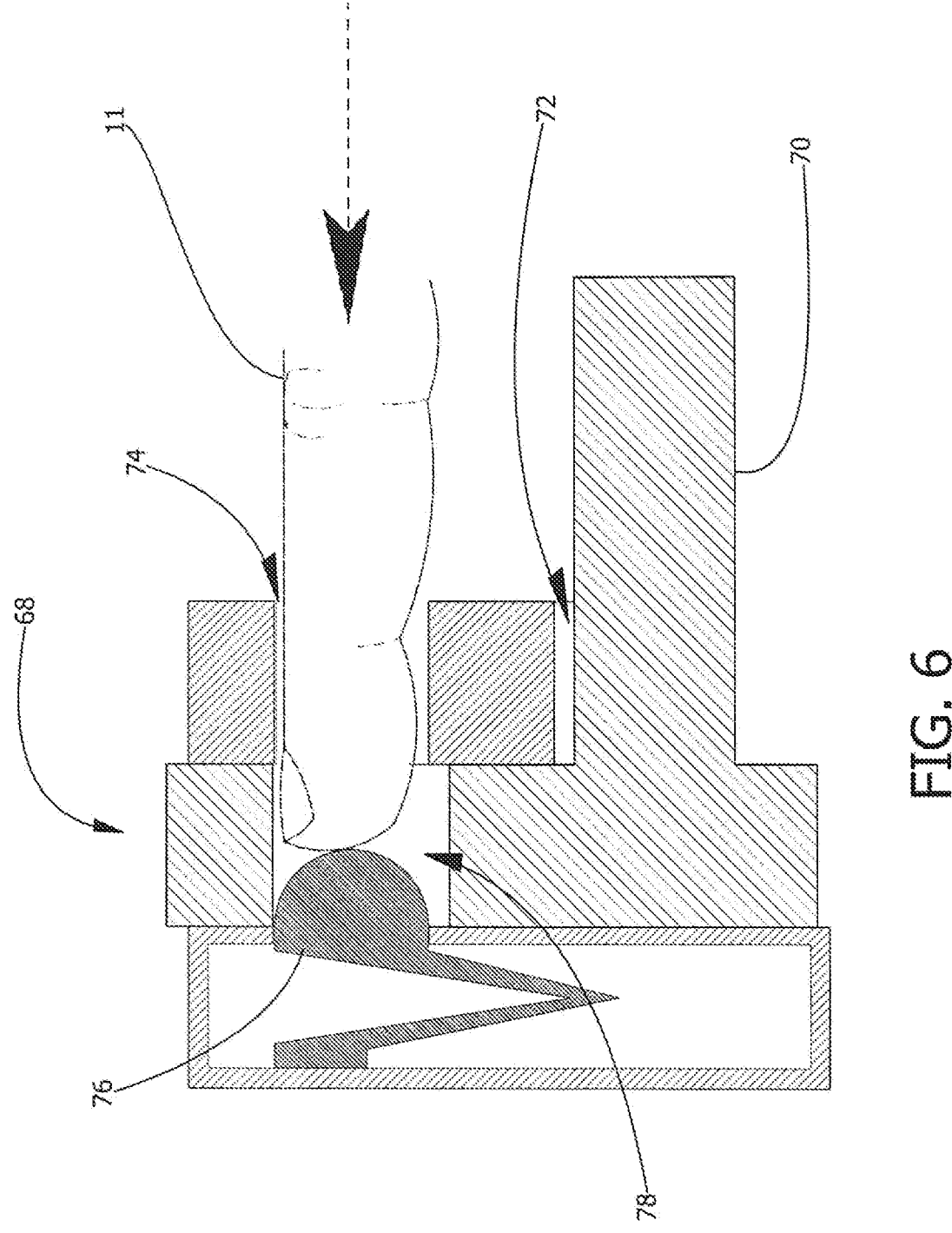
FIG. 6 is a cross-sectional view of an embodiment of the disclosure.
Figure 7:
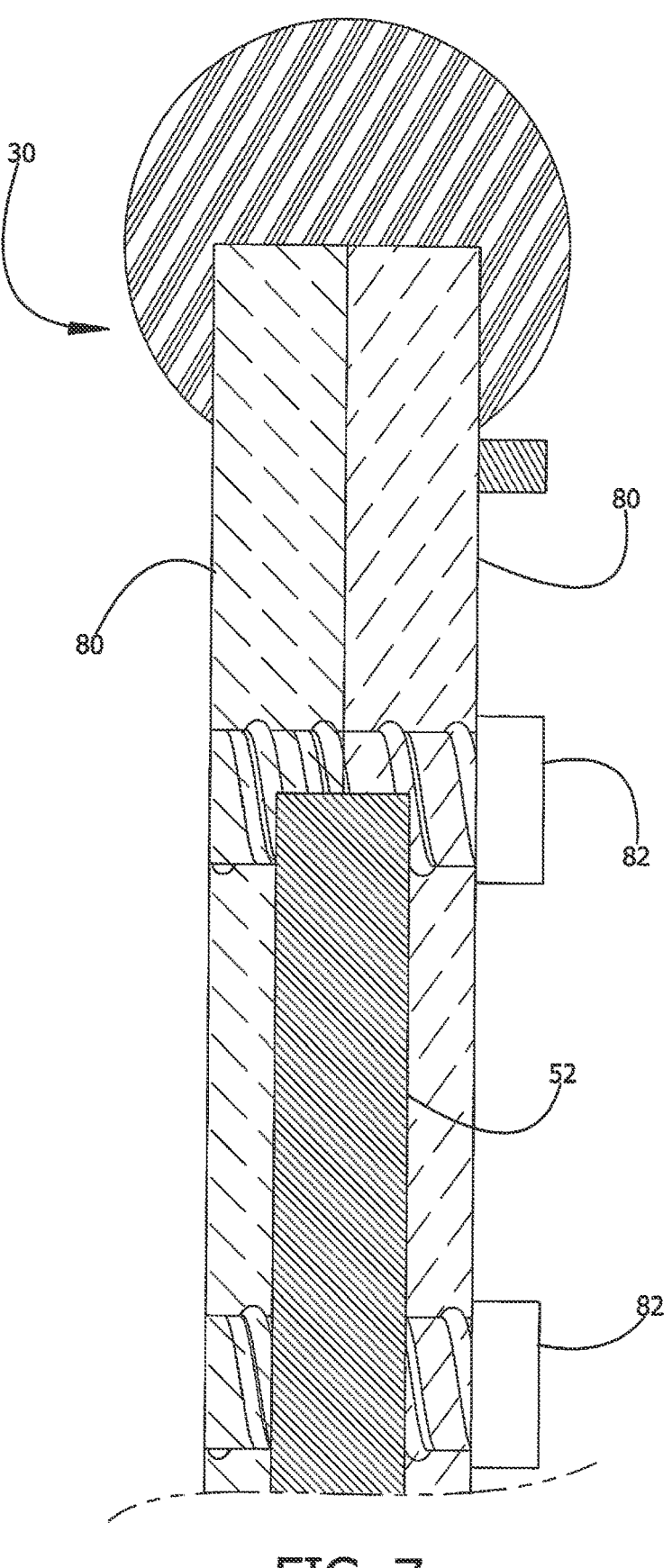
FIG. 7 is a cross-sectional view of an embodiment of the disclosure.

The scooter assembly 54 generally includes a bar 58 having a scooter portion 60 and a coupling portion 62. As shown in FIG. 4, the scooter portion 60 is on the opposite side of the bar 58 from the coupling portion 62. A support platform 64 is attached to the scooter portion 60. The coupling portion 62 extends forwardly from the support platform 64. The support platform 64 is configured to provide support for the user 11 when the user 11 is riding the scooter 56 and standing on the support platform 64. For example, the user 11 may ride the scooter 56 in the traditional manner shown in FIG. 10, specifically, by resting one foot on the support platform 64 and propelling themselves forward by kicking against the ground surface with the other foot. A second wheel 66 is rotatably attached to the scooter portion 60 adjacent to the support platform 64.

A connector 68 releasably couples the handle 32 with the coupling portion 62. In one example, shown in FIGS. 4 and 6, the connector 68 comprises a pin 70 that is attached to and extends outwardly from the shaft 34. The pin 70 is generally positioned proximate to the fork 38. The coupling portion 62 has a pin chamber 72 therein. The pin chamber 72 is configured to receive the pin 70. The pin 70 stabilizes the bar 58 on the handle 32 when the pin 70 is received by the pin chamber 72.

The coupling portion 62 may also have a button chamber 74 therein. The button chamber 74 is generally adjacent to the pin chamber 72. A button 76 is attached to the bar 58. The button 76 is movably coupled to the bar 58 whereby the button 76 is biased to extend outwardly from the button chamber 74. The button 76 retracts inwardly to the button chamber 74 when the button 76 is pushed toward the button chamber 74 thereby releasing the bar 58 from the handle 32. The shaft 34 has an aperture 78 extending therethrough. The aperture 78 is positioned adjacent to the shaft 34 and is aligned with the button chamber 74 when the handle 32 is coupled with the bar 58 whereby the button 76 extends into the button chamber 74 through the aperture 78 thereby locking the handle 32 into place and stabilizing the handle 32 on the bar 58.

Figure 8:
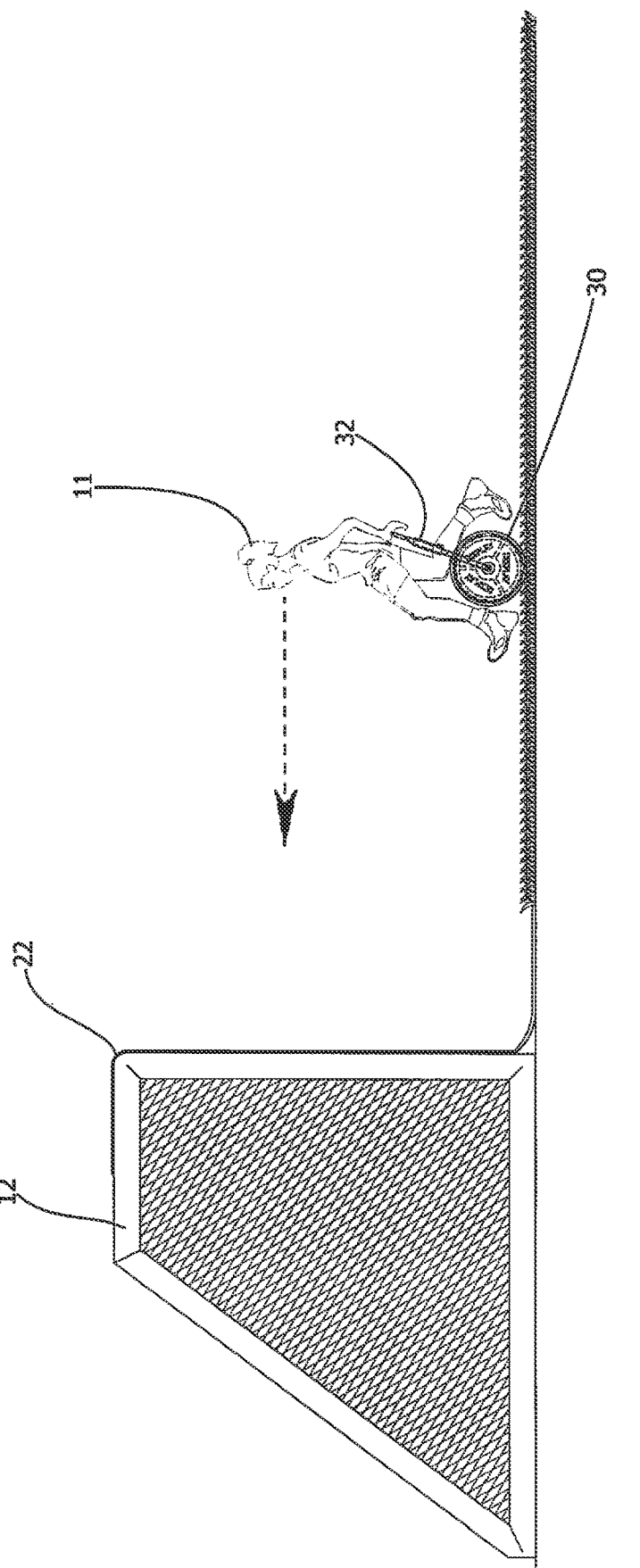
FIG. 8 is an in-use view of an embodiment of the disclosure.
Figure 9:
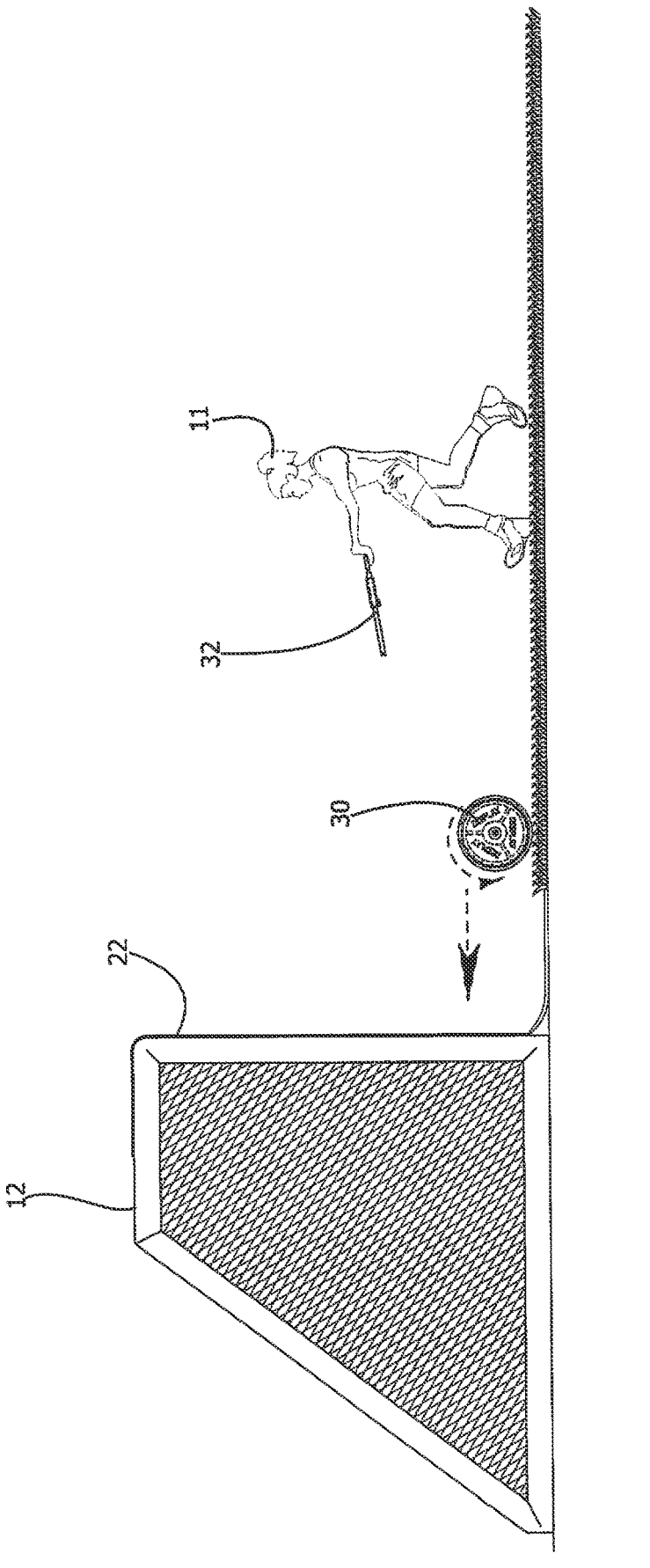
FIG. 9 is an in-use view of an embodiment of the disclosure.
Figure 10:
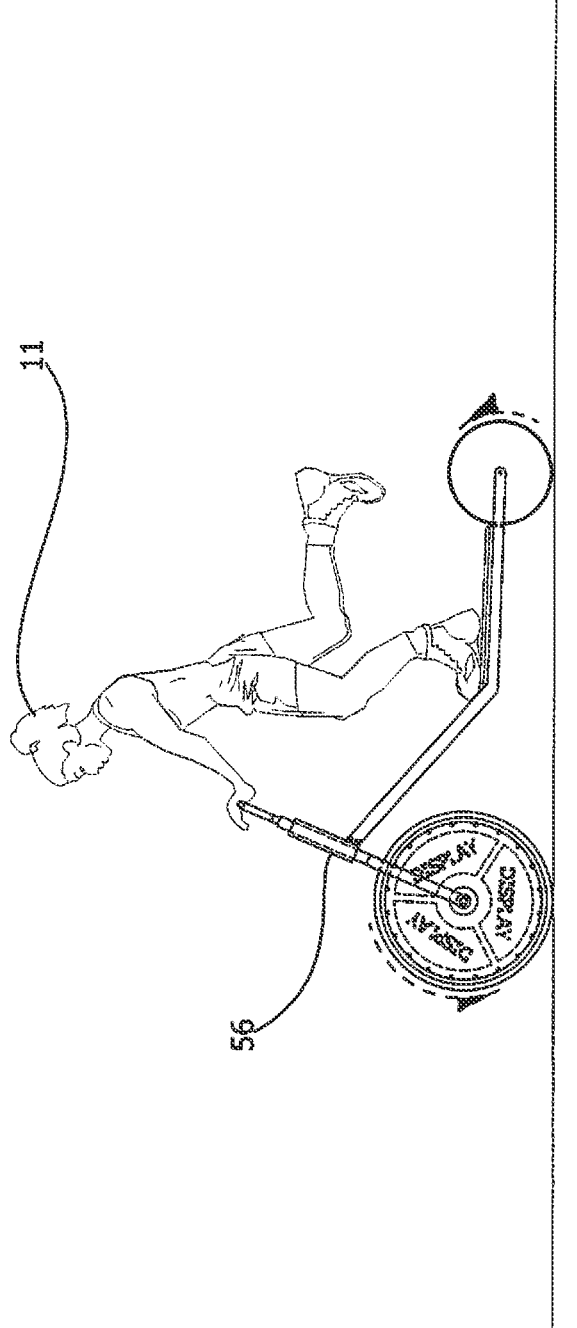
FIG. 10 is an in-use view of an embodiment of the disclosure.

In use, the user 11 can ride the scooter 56 to an area where the user 11 desires to play the sports game system 10. The user 11 can then disassemble the scooter 56 by pushing the button 76 to release the handle 32 from the bar 58. The user 11 may also disconnect the handle 32 from the first wheel 30 by disconnecting the fastener 46. As shown in FIGS. 8 and 9, the user 11 can then manipulate the first wheel 30 with the handle 32 by resting the axle 44 within each of the notches 42 on the pair of arms 40. The user 11 can thereby use the handle 32 to launch the first wheel 30 toward the open front side 14 of the net 12. If the user 11 is playing with the plurality of strips 22, the user 11 can aim the first wheel 30 at the plurality of strips 22 positioned across the open front side 14. Because the fastener 46 is removed, the first wheel 30 will be propelled toward the net 12 as the user 11 raises their arm and disconnects the axle 44 from the notches 42, as shown in FIG. 9. For example, the user 11 can throw the first wheel 30 similarly to the way the user 11 would throw a bowling ball. The user 11 may stand a distance from the net 12 and roll, push, or throw the first wheel 30 toward the net 12, trying to hit one of the plurality of strips 26 to score the points corresponding with the one of the plurality of strips 26. When finished playing, the user 11 can reconnect the fastener 46 to rotatably couple first wheel 30 to the handle 32. The user 11 can reassemble the scooter 56 by placing the pin 70 into the pin chamber 72 and locking the button 76 into the button chamber 74 through the aperture 78. Then, the user 11 can once again ride the scooter 56.

Some embodiments may only comprise the first wheel and the handle, with no net, scooter assembly, or connector. In such embodiments, a user may launch the first wheel toward an alternative goal that is available in the area surrounding where the user is playing the game, such as a soccer net, a pole, or a tree. The alternative goal may even be as simple as a particular area the user decides to use as the goal. Other embodiments may comprise the first wheel, the handle, the scooter assembly, and the connector, without including the net. Again, the user may launch the first wheel toward the alternative goal, then the user may assemble the scooter when finished playing and ride the scooter home or to another location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:
1. A sports game system comprising:
a net having an open front side, a closed rear side, and a peripheral side, the closed rear side and the peripheral side bounding an inner area, the open front side permitting access to the inner area;
a first wheel being configured to be launched toward the net;
a handle having a shaft and a grip, the handle being releasably couplable to the first wheel, the handle being configured to propel the first wheel toward the net when the first wheel is launched using the handle;
a fork extending from the shaft opposite the grip, the fork releasably coupling the first wheel to the handle;
the net being configured to receive the first wheel within the inner area when the first wheel is launched toward the open front side;
a scooter assembly being releasably couplable to the handle thereby forming a scooter when the first wheel is coupled to the handle, the scooter being configured to carry a user when the user is riding on the scooter, the scooter assembly comprising:
a bar having a scooter portion and a coupling portion;
a support platform being attached to the scooter portion, the coupling portion extending forwardly from the support platform, the support platform being configured to provide support for the user when the user is riding the scooter and standing on the support platform; and
a second wheel being rotatably attached to the scooter portion adjacent to the support platform.
2. The sports game system of claim 1, further comprising a plurality of strips being positionable across the open front side, each of the plurality of strips corresponding to a point, wherein the point is scored when the first wheel collides with a one of the plurality of strips after the first wheel is launched toward the net.
3. The sports game system of claim 1, further comprising a fastener releasably coupling the handle to the first wheel.
4. The sports game system of claim 1, the fork further comprising:
a pair of arms extending downwardly from the shaft; and
each of the pair of arms having a notch extending therethrough.
5. The sports game system of claim 4, the first wheel further comprising an axle extending outwardly through the first wheel, each of the notches being configured to receive the axle when the first wheel is coupled to the handle.
6. The sports game system of claim 5, further comprising a pair of nuts, wherein the axle includes an axle threading on exposed ends of the axle and each nut includes a fastener threading, the axle threading being complementary to the fastener threading of each nut such that each nut is threadably coupled to the axle, wherein rotation of each nut on the axle when each of the notches has received the axle is configured to tighten the nut on the axle thereby providing resistance to disengagement of each of the notches from the axle and frictionally securing the handle to the first wheel until said first wheel is launched.
7. The sports game system of claim 1, further comprising a display board being removably mounted on the first wheel.
8. The sports game system of claim 1, further comprising a connector releasably coupling the handle with the coupling portion.
9. The sports game system of claim 8, the connector further comprising:

a pin being attached to and extending outwardly from the shaft, the pin being positioned proximate to the fork;

the coupling portion having a pin chamber therein, the pin chamber being configured to receive the pin, the pin stabilizing the bar on the handle when the pin is received by the pin chamber;

the coupling portion having a button chamber therein, the button chamber being adjacent to the pin chamber;

a button being attached to the bar, the button being movably coupled to the bar whereby the button is biased to extend outwardly from the button chamber, wherein the button retracts inwardly to the button chamber when the button is pushed toward the button chamber thereby releasing the bar from the handle; and the shaft having an aperture extending therethrough, the aperture being positioned adjacent to the shaft, the aperture being aligned with the button chamber when the handle is coupled with the bar whereby the button extends into the button chamber through the aperture thereby stabilizing the bar on the handle.

10. A sports game system comprising:

a net having an open front side, a closed rear side, and a peripheral side, the closed rear side and the peripheral side bounding an inner area, the open front side permitting access to the inner area;

a plurality of strips being arranged across the open front side, each of the plurality of strips corresponding to a point;

a first wheel being configured to be launched toward the net;

a handle having a shaft and a grip, the shaft extending downwardly from the grip, the handle being releasably couplable to the first wheel, the handle being configured to propel the first wheel toward the net when the first wheel is launched using the handle;

the net being configured to receive the first wheel within the inner area when the first wheel is launched toward the open front side, wherein the front wheel passes through the open front side between the plurality of strips, and wherein a user scores the point when the first wheel collides with a one of the plurality of strips after the user launches the first wheel toward the net;

a fork extending from the shaft opposite the grip, the fork releasably coupling the first wheel to the handle, the fork including:

a pair of arms extending downwardly from the shaft;

each of the pair of arms having a notch extending therethrough;

an axle extending outwardly through the first wheel, each of the notches being configured to receive the axle when the first wheel is coupled to the handle;

a fastener releasably coupling the handle to the axle, the fastener comprising a nut;

the axle including an axle threading and the fastener including a fastener threading, the axle threading being complementary to the fastener threading such that the fastener is threadably coupled to the axle, wherein rotation of the fastener on the axle when each of the notches has received the axle is configured to tighten the fastener on the axle thereby providing resistance to disengagement of each of the notches from the axle and frictionally securing the handle to the first wheel until said first wheel is launched;

a display board being removably mounted on the first wheel, the display board surrounding the axle;

a scooter assembly being releasably couplable to the handle thereby forming a scooter when the first wheel is coupled to the handle, the scooter being configured to carry a user when the user is riding on the scooter, the scooter assembly comprising:

a bar having a scooter portion and a coupling portion;

a support platform being attached to the scooter portion, the coupling portion extending forwardly from the support platform, the support platform being configured to provide support for the user when the user is riding the scooter and standing on the support platform;

a second wheel being rotatably attached to the scooter portion adjacent to the support platform;

a connector releasably coupling the coupling portion with the handle, the connector comprising:

a pin being attached to and extending outwardly from the shaft, the pin being positioned proximate to the fork;

the coupling portion having a pin chamber therein, the pin chamber being configured to receive the pin, the pin stabilizing the bar on the handle when the pin is received by the pin chamber;

the coupling portion having a button chamber therein, the button chamber being adjacent to the pin chamber;

a button being attached to the bar, the button being movably coupled to the bar whereby the button is biased to extend outwardly from the button chamber, wherein the button retracts inwardly to the button chamber when the button is pushed toward the button chamber thereby releasing the bar from the handle; and the shaft having an aperture extending therethrough, the aperture being positioned adjacent to the shaft, the aperture being aligned with the button chamber when the handle is coupled with the bar whereby the button extends into the button chamber through the aperture thereby stabilizing the bar on the handle.

* * * * *